United States Patent [19]

Bannon

[11] 4,235,706
[45] Nov. 25, 1980

[54] MULTISTAGE CONDENSATION PROCESS

[75] Inventor: Robert P. Bannon, Houston, Tex.

[73] Assignee: Shell Oil Company, Houston, Tex.

[21] Appl. No.: 30,962

[22] Filed: Apr. 18, 1979

[51] Int. Cl.³ .......................... B01D 3/14; C10G 7/00
[52] U.S. Cl. ................................. 208/347; 202/186;
203/87; 208/358
[58] Field of Search .................... 202/186; 203/87, 98;
208/358, 347

[56] References Cited
U.S. PATENT DOCUMENTS

| | | | |
|---|---|---|---|
| 2,994,644 | 8/1961 | Clay | 203/98 |
| 3,320,159 | 5/1967 | Potts | 208/363 |
| 3,822,193 | 7/1974 | Chapman | 203/98 |
| 4,132,604 | 2/1979 | Alexion et al. | 203/87 |
| 4,163,695 | 8/1979 | Archerd | 203/18 |

*Primary Examiner*—Herbert Levine

[57] ABSTRACT

A process for the multistage condensation of an overhead fraction is disclosed. The process employs a single accumulation zone for at least two stages of the condensation, the accumulation zone being characterized by separate accumulation sections formed by a barrier which provides, at or near its bottom, limited liquid flow between the sections.

3 Claims, 1 Drawing Figure

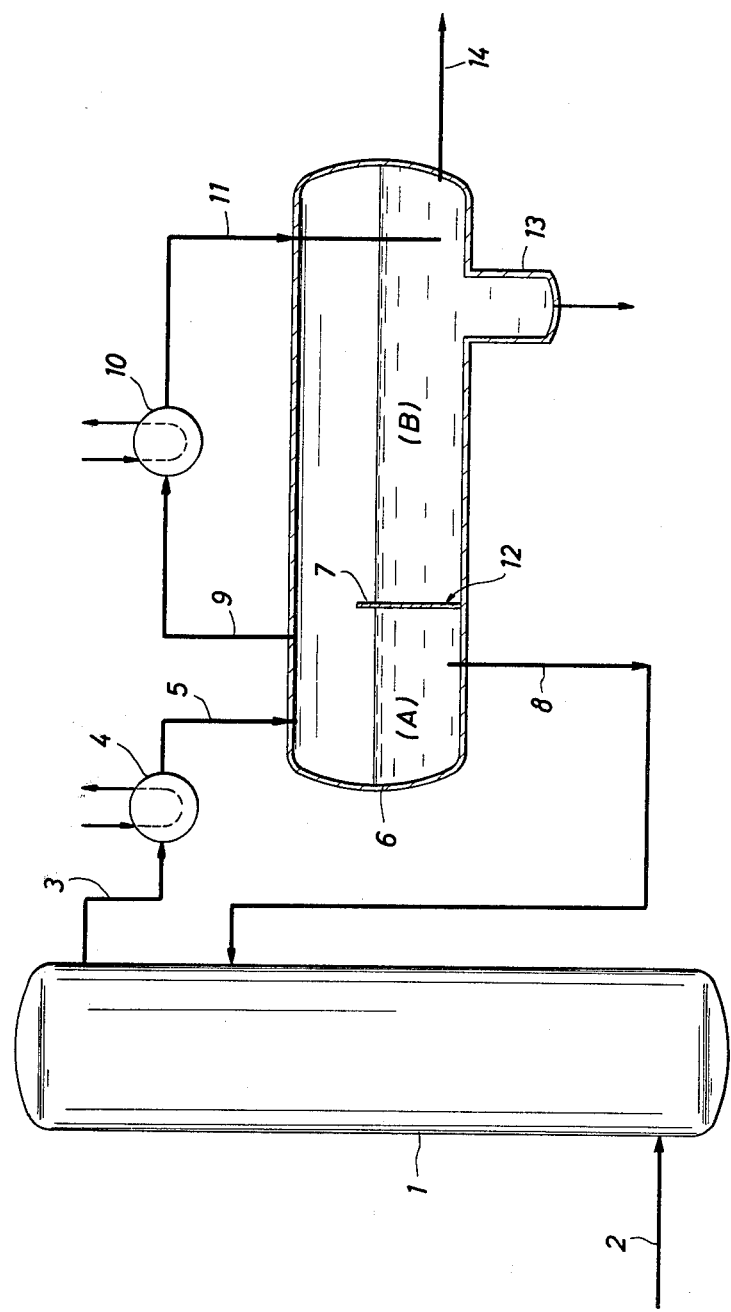

MULTISTAGE CONDENSATION PROCESS

BACKGROUND OF THE INVENTION

Rapid escalation of energy costs in recent years has spurred efforts to improve efficiency in plant operations. Distillation practices have received great attention, since the process of distillation, the predominant unit operation in the oil refining and chemical industries, consumes prodigious amounts of energy.

One energy-saving procedure is the practice of multiple stage, e.g., two-stage, condensation of the overhead vapors from a distillation column. Multi-stage condensation procedures allow energy savings by permitting the use of higher temperatures at which heat may be removed from the overhead vapor. Such a process is described, for example, in U.S. Pat. No. 3,320,159. In at least one two-stage procedure for condensation of distillation column overhead vapors, the first stage of condensation is operated under conditions to condense just enough liquid to provide reflux for the distillation column, and the second stage of condensation is operated under conditions to provide the top product of the column. For two-stage condensation to be of value in heat recovery, the vapor or top product from the distillation column must be a multi-component mixture, and there must be a reasonable temperature spread between its dew point and bubble point, e.g. 20 degrees F. Most hydrocarbon distillations fit this requirement.

A very common commercial process for which two-stage condensation can be helpful is the separation of gasoline boiling range materials (often 400° to 430° F. ASTM end point) as the top product from a feed containing also kerosene, jet fuel, distillate fuel and gas oil components. As now practiced, however, two-stage condensation procedures have the disadvantages of added capital cost and increased complexity. In general, the process, as known, has required the use of two accumulators, with interconnecting piping, pumps, etc. Accordingly, a need has existed for a process which would provide the advantages of two-stage condensation without the disadvantages mentioned. The present invention satisfies that need.

SUMMARY OF THE INVENTION

The invention, therefore, is a process which comprises:

(a) distilling a multi-component liquid in a distillation column under conditions effective to provide an overhead fraction having a temperature differential of at least 20° F. between its dew point and its bubble point;

(b) condensing a first portion of the overhead fraction in a first condensation zone, (c) passing vapor and liquid from the first condensation zone and separating said vapor and said liquid, and accumulating said liquid in a first accumulation section of an accumulating zone, said accumulating zone also comprising a second accumulation section having vapor communication with the first accumulation section but being separated from said first accumulation section by a barrier which provides limited flow of liquids between the first accumulation section and the second accumulation section, the first accumulation section and the second accumulation section being at different liquid temperatures;

(d) passing said vapor to a second condensation zone and condensing the bulk of the vapor in said zone at a lower temperature than in the first condensation zone to form a liquid and passing the condensed liquid to the second accumulation section of the accumulating zone.

In its preferred form, the invention comprises a process wherein the vapor and liquid in the first condensation zone are separated in the first accumulation section.

The invention may be applied to any liquid suitable for multi- or two-stage condensation. For example, the invention may be employed in crude oil distillation processes, and distillation of products from conversion processes such as catalytic cracking, hydrocracking, and delayed coking. The invention is preferably utilized in distillation processes in which the top product separated is a gasoline fraction. As indicated, the top product should be a multi-component mixture, and there should be a reasonable temperature differential, say at least 20° F., preferably from 20° F. to 225° F., between its dew point and bubble point. The particular conditions applied, i.e., pressure, temperature, throughput, etc., are those applicable to multi- or two-stage condensation, and are well understood by those skilled in the art. Again, condensation need not be completed in the second condensation zone, as will be apparent to those skilled in the art, and provision may also be made for removal of non-condensables. Preferably, the condensation is substantially completed in this stage.

DETAILED DESCRIPTION OF THE INVENTION

In order to describe the invention in greater detail, reference is made to the accompanying drawing. The single FIGURE illustrates diagrammatically a fractionation and two stage condensation procedure representative of the invention. As illustrated, an accumulation zone is provided which is divided into sections by a barrier structured to allow unrestricted vapor flow between the sections, but limited liquid flow therebetween. In the embodiment shown, the liquid-vapor stream from the first condensation stage is separated in the first accumulation section of the accumulating zone, although those skilled in the art will recognize that the phase separation may be made before entry of the stream into the accumulating zone. Numeral (1) designates a distillation column, preferably a fractionating column for a naphtha top product. The feed enters column (1) through line (2), and is fractionated in a known fashion. Overhead vapor exits column (1) through line (3) at a temperature of about 340° F. and is passed to condenser (4) where a portion of the vapor is condensed. For purposes of this illustration, the overhead is assumed to have a condensation range of about 100° F., e.g. to condense between about 340° F. and 240° F. at column operating pressure. The amount condensed is that sufficient to provide reflux for column 1, while at the same time providing for enhanced heat recovery of the energy utilized in the distillation. While the process disclosed in U.S. Pat. No. 3,320,159 specifies condensation of water, the invention does not require that water be condensed. Those skilled in the art may readily determine the amount required for adequate reflux of the distillation column. Any suitable type of condensation or heat exchange system may be employed, as will also be evident to those skilled in the art. Preferably, the vapor may be partially condensed either by indirect heat exchange with another process stream or by direct contact with condensate that has been cooled by exchange.

From unit (4), the vapor-liquid stream is passed through line (5) to accumulating zone (6). The external design of accumulating zone (6) may vary considerably, but the critical feature therein is the provision of a barrier (7) which divides the zone into two separate liquid-containing sections, there being only limited liquid communication between the two sections, as will be illustrated later. At the same time, barrier (7) is constructed so that it does not limit vapor flow in accumulating zone (6). Accordingly, the vapor-liquid stream in line (5) enters accumulating zone (6) where liquid separates out in the phase separation, accumulation section (A) formed by the walls of unit 6 and barrier (7). Vapor is free, however, to occupy the entire open volume of unit (6). The temperature of liquid in section (A) will be approximately 280° F. Liquid from section A is returned via line (8) to column 1 to provide the reflux mentioned previously.

Vapor from zone (6) is passed through line (9) to heat exchange or condensation zone (10). Condensation zone (10) may be operated to provide an outlet temperature of, e.g., 150° F. As illustrated, the condensate flows to accumulating section (B) of zone 6 through a sealed dip leg (11) to counterbalance the pressure drop in the condensation zone (10). If the vapor in line (9) contains a significant quantity of "non-condensables", the liquid vapor stream from condenser (10) may be vented first (not shown) before the liquids are passed to section (B). While the invention is designed primarily for "two-stage" procedures in which the condensate from the second stage is top product, those skilled in the art will recognize that any "non-condensables" from the second condensation stage may be processed by conventional techniques. While a minor portion of the vapor in the open space above section B will condense, such condensation is not of major significance.

As indicated, the barrier separating zone (6) into two sections is limited so that the sections have open vapor communication to allow vapor flow and pressure equalization between the sections. Barrier (7) is provided further with an opening (12) near or at the bottom thereof, for liquid level balance and for flow of heavy second liquid phase to a boot (13) for separate drawoff. The size of the opening is determined by the volumes of liquid to be balanced, keeping in mind that significant mixing of the liquids in sections (A) and (B) is not desired. The "opening" may, as will be understood by those skilled in the art, be a multiplicity of smaller openings, the total cross-sectional area of the openings being such as to fulfill the requirements noted. In the illustration, given an accumulating vessel or zone having the dimensions 12 ft. in diameter by 20 ft. tangent to tangent, opening (12) may be simply a hole 6 inches by 6 inches. Barrier (7) may be constructed of any suitable impermeable material, such as steel or ceramic, and the opening should be baffled to prevent convection flow. Barrier (7) may be insulated to reduce heat flow from section (A) to section (B) but in the usual application this heat flow will not be significant without insulation. Product may be drawn off through line 14.

The process of the invention provides distinct advantages over the prior procedure of utilizing two accumulating zones with connecting piping. The elimination of one zone reduces capital cost, it being unnecessary to double the size of the zone employed since a common surge space is provided. Pressure differential problems between two units are avoided, as are connecting pipes, pumps, etc. At the same time, the limited communication of the liquids ensures that sufficient liquid will be available for reflux. The term "stage" as is used herein, includes two or more units of the same type operated in series.

I claim as my invention:
1. A process comprising:
    (a) distilling a multi-component liquid in a distillation column under conditions effective to provide an overhead fraction having a temperature differential of at least 20° F. between its dew point and its bubble point;
    (b) condensing a first portion of the overhead fraction in a first condensation zone;
    (c) passing vapor and liquid from the first condensation zone and separating said vapor and said liquid, and accumulating said liquid in a first accumulation section of an accumulating zone, said accumulating zone also comprising a second accumulation section having vapor communication with the first accumulation section but being separated from said first accumulation section by a barrier which provides limited flow of liquids between the first accumulation section and the second accumulation section near or at the bottom of said barrier, the first accumulation section and the second accumulation section being at different liquid temperatures;
    (d) passing said vapor to a second condensation zone and condensing the bulk of the vapor in said zone at a lower temperature than in the first condensation zone to form a liquid and passing the condensed liquid to the second accumulation section of the accumulating zone.
2. The method of claim 1 wherein the vapor and liquid present in the first condensation zone are separated in the first accumulation section.
3. The method of claim 2 wherein the limited flow of liquids is through an opening sized to achieve liquid balance without significant mixing of liquids between the sections.

* * * * *